(12) United States Patent
De Boer et al.

(10) Patent No.: US 7,424,707 B2
(45) Date of Patent: Sep. 9, 2008

(54) METHOD FOR AUTOMATIC UPDATING OF SOFTWARE

(75) Inventors: Gerrit De Boer, Hildesheim (DE); Oliver Dominguez Lorenzo, Badalona (ES)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,510

(22) PCT Filed: Jan. 10, 2002

(86) PCT No.: PCT/DE02/00051

§ 371 (c)(1),
(2), (4) Date: Dec. 23, 2003

(87) PCT Pub. No.: WO02/063464

PCT Pub. Date: Aug. 15, 2002

(65) Prior Publication Data

US 2005/0102661 A1 May 12, 2005

(30) Foreign Application Priority Data

Feb. 7, 2001 (DE) .................... 101 05 454

(51) Int. Cl.
*G06F 9/44* (2006.01)

(52) U.S. Cl. ..................................... 717/173

(58) Field of Classification Search ........... 717/107, 717/122–128, 162–178, 130; 370/313; 707/1, 707/103 R, 206; 709/231, 201, 223; 705/1; 719/310; 702/119–128
See application file for complete search history.

(56) References Cited

U.S. PATENT DOCUMENTS

| | | | | |
|---|---|---|---|---|
| 5,410,703 A * | 4/1995 | Nilsson et al. | ............... | 717/168 |
| 5,493,682 A | 2/1996 | Tyra et al. | | |
| 5,699,275 A * | 12/1997 | Beasley et al. | ............... | 709/221 |
| 5,724,272 A * | 3/1998 | Mitchell et al. | ............. | 702/123 |
| 5,732,074 A * | 3/1998 | Spaur et al. | .................. | 370/313 |
| 5,847,955 A * | 12/1998 | Mitchell et al. | ............... | 700/86 |
| 6,044,224 A * | 3/2000 | Radia et al. | .................. | 717/162 |
| 6,366,898 B2 * | 4/2002 | Taivalsaari et al. | ............. | 707/1 |
| 6,546,553 B1 * | 4/2003 | Hunt | .......................... | 717/174 |
| 6,883,163 B1 * | 4/2005 | Schwabe | ..................... | 717/126 |
| 2002/0004815 A1 * | 1/2002 | Muhlestein et al. | ......... | 709/201 |

FOREIGN PATENT DOCUMENTS

EP  0 848 341  6/1998

* cited by examiner

*Primary Examiner*—Tuan A Vu
(74) *Attorney, Agent, or Firm*—Kenyon & Kenyon LLP

(57) ABSTRACT

A method for automatically updating software which is used for updating software which is running on a system, by using new software modules, these software modules first being tested, and application modules then being derived from these software modules. The actual new function is implemented by the application modules. The software modules may be received advantageously over a wireless interface. The method according to the present invention is particularly suited for applications where software is used in a motor vehicle. The application module is usually derived from the software module on the basis of the principle of inheritance. The software module is tested by a call instruction using test parameters.

9 Claims, 1 Drawing Sheet

METHOD FOR AUTOMATIC UPDATING OF SOFTWARE

FIELD OF THE INVENTION

The present invention is directed to a method for automatically updating (expanding the functionality of) software.

BACKGROUND INFORMATION

It is already known that it is possible to update software that is currently in operation through the use of software modules. To test the software modules, test vectors are used which require a shielded test environment.

SUMMARY OF THE INVENTION

The method according to the present invention for automatically updating software has the advantage over the related art that this updating is performed in a way that is shielded from the user during operation by using a test. This prevents, in particular, interruptions in operation during replacement (renewal) of the software. In addition, it is advantageous that at least one application module is derived from the software module used for the test and is then ultimately used in the software. This saves on code and resources as well as results in faster loading of the software modules.

In addition, it is advantageous that this test is arbitrarily scalable. Furthermore, the test is repeatable multiple times without interfering with operation of the software. The test is performed in particular before using new application modules, so that use occurs only by tested application modules. The method according to the present invention also simplifies step-by-step expansion of the software without resulting in impairments for a user. The test is also controllable by an application which is called up and thus alleviates the load on the system administration.

It is also advantageous that the method according to the present invention permits the use of the principle of inheritance known from object-oriented programming. When this principle of inheritance is applied, the application modules are derivable in a simple manner from the software modules that are newly received. In addition, functions that do not require testing may then also be added to the application modules. This includes, for example, access to output media such as display screens or loudspeakers.

It is particularly advantageous that the software module, which is used to update the software, is received via a wireless interface. Thus, the method according to the present invention is advantageously suitable for mobile reception. For example, the software module may be received by a digital radio broadcast method, e.g., DAB (Digital Audio Broadcasting) and then added to the wireless broadcast receiver software. However, the method according to the present invention is not limited to radio broadcast receivers. Instead, it may also be used for wireless transmitters or any other systems which use software whose functionality is expandible and which has a loading device, e.g., a wireless interface. Thus, an interface to the outside world is needed. The method according to the present invention is thus applicable mainly to platform-independent software, but compiling, i.e., generating a runnable code should be omitted. As an alternative, it is also possible to perform the software update according to the present invention via a wired access. Examples include networked computers.

It is also advantageous that in deriving the at least one application module from the software module, functions intended only for the test are overwritten. These are then functions which are suitable only for the test but are unnecessary or inadequate for normal operation. For example, writing to a data file is not tested during the test but instead only the checking of access to writing is tested.

The test of the software module is advantageously performed by calling up the test parameters. Test parameters thus specify in which situations the software module is tested. Particularly critical situations may thus be tested even if there is only a low probability that these situations will occur.

Furthermore, it is advantageous that the software monitors the test of the software module by setting a variable and repeats the test as a function of the content of this variable. Thus, even an accidentally faulty test may be verified or refuted by performing the test again.

Finally, it is also advantageous that the device for implementing the method has a processor on which the software runs and which implements the method according to the present invention and has a memory for temporary or permanent storage of data as well as a loading device designed for loading the software module. The loading device may advantageously be a wireless interface, so that the software module is receivable via wireless signals. It is thereby advantageous in particular that the device is in a vehicle to replace and/or update software for the various components in the vehicle. This then presupposes that the components in the vehicle are interconnected. To this end, a bus system may be used, for example, over which the software modules are then distributed to the individual components. In the case of time-critical automotive components such as an anti-lock brake system (ABS), it is of course necessary for the software to be updatable during operation. Interruption in the functioning of the ABS system is unacceptable, so the method according to the present invention is particularly suitable here.

DETAILED DESCRIPTION

Due to growing use of processors in an increasing number of systems, e.g., in automotive systems, and due to the ever higher performance levels demanded of these systems, the software in these processor systems must be updated and/or replaced regularly. Many of these systems, e.g., in a vehicle, are interconnected and have one interface to the outside world, e.g., a wireless interface via a radio receiver or a cell phone. Systems such as monitoring systems or electronic household systems are also interconnected and have interfaces designed either as wireless interfaces or they are connected to the outside world by wired communication pathways. Then new software modules are received over these interfaces and brought to the proper systems to replace the software. To take into account security aspects such as access to these systems, the functionality of the new software module must be checked, so that the system, the running software, does not suffer, i.e., is not damaged by the new software module. In the case of running systems such as a motor vehicle, this software update must be implementable during operation. Thus, the testing of these new software modules must take place in a manner that is shielded from the user. Therefore, according to the present invention, this new software module is tested during operation of the software, and then at least one application module is derived as a function of the result of the test and the application module is used by the software for operation.

Figure 1:
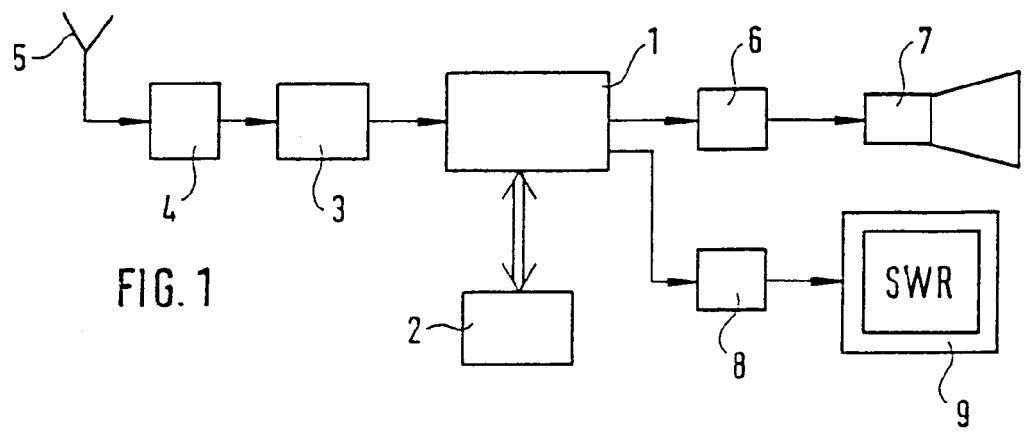
FIG. 1 shows a block diagram of a device according to the present invention, a radio receiver in this case.

FIG. 1 shows a block diagram of a device according to the present invention for implementing the method according to the present invention of automatically updating software. A radio receiver is shown here as an example, but it is also possible for any other system which has an interface to the outside and is operated with software to be used to implement the method according to the present invention—e.g., networked household appliances or satellites or other isolated systems having at least one interface.

An antenna 5 is connected to an input of a high-frequency receiver 4. A data output of high-frequency receiver 4 is connected to a data input of a signal processor 3. Signal processor 3 is in turn connected to a data input of a processor 1. Processor 1 is connected to a memory 2 via a data input/output. Processor 1 is connected to a signal processor 6 via a first data output. The processor is connected to a signal processor 8 via a second data output. Signal processor 6 has an output to a loudspeaker 7. Signal processor 8 has an output to a display 9.

Software for operating the radio receiver is stored in memory 2 and runs on processor 1. Memory 2 also provides temporary storage of interim results occurring during operation of the software. Memory 2 is thus used both as a permanent memory and as a temporary memory. It is possible for memory 2 to have different physical media, e.g., a semiconductor memory for the temporary storage and a magnetic memory, e.g., a hard drive for the permanent storage. A new software module is received over antenna 5 via radio broadcast signals, which are digital in this case. Suitable digital radio broadcast methods for data transmission include in particular DAB (Digital Audio Broadcasting) and DVG (Digital Video Broadcasting), DRM (Digital Radio Mondiale) as well as other digital radio broadcasting methods, because with these radio broadcast methods it is possible to transmit not only the actual audio programs and optionally television programs but also other multimedia data or text data. These radio broadcast methods are comparatively broadband, so that it is readily possible to transmit additional data besides the actual radio broadcast programs, and they have a frame structure which allows transmission of almost any data format. This data also includes software parts such as the software module that is to be added to the software which runs on processor 1.

The digital radio broadcast signals are then filtered in high-frequency receiver 4, amplified and converted to an intermediate frequency. This is followed by digitizing the received broadcast signals. The resulting digital data stream is then transmitted to signal processor 3 which performs channel decoding and source decoding. The useful data from the digital data stream is then transmitted to processor 1. As an alternative, the functions of digital processor 3 may also be distributed to processor 1 and high-frequency receiver 4. In addition, it is possible for the analog digital conversion to be transmitted from high-frequency receiver 4 to signal processor 3.

Processor 1 then processes the received data and sends it, if necessary, to playback means, loudspeaker 7 and display 9. By appropriate decoding, processor 1 discovers that the software module for updating its own software is also present among the data. This software module is then tested during operation of the actual software. To do so, an object that would like to use the software module is called up. For example, if the software module improves the triggering of display 9, then processor 1 calls up an object which displays the data.

A test of the software module is then performed using test parameters. If this test is successful, a corresponding variable is tested in memory 2 and at least one application module is derived from the software module and then executes the new functions. This application module is then executed by the object and is subsequently also available for repeated use. The test is repeatable, e.g., when a first test run has turned out negative.

In deriving the at least one application module, functions intended only for testing in the software module may be overwritten. The derivation is performed by the principle of inheritance known from information technology.

Figure 2:
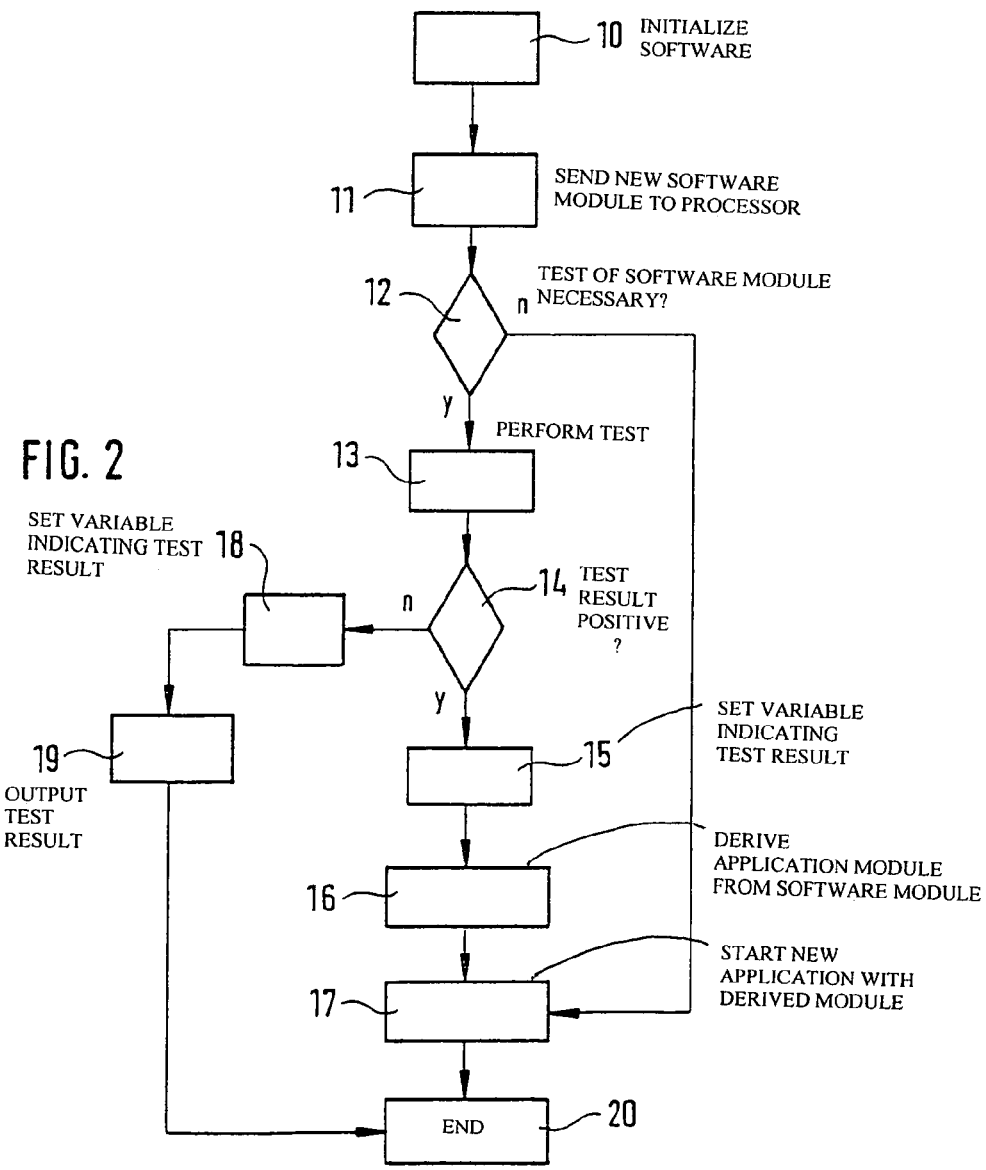
FIG. 2 shows a flow chart of the method according to the present invention.

FIG. 2 shows a flow chart of the method according to the present invention for automatically updating software. In method step 10, the software on processor 1 is initialized. In method step 11, a new software module is received via antenna 5 and sent to processor 1 as a data stream. By calling up an object which requires this software module, it is then recognized that this software module is new and, if appropriate, that a test is necessary. In method step 12, a check is performed to determine whether this test is necessary. If this is the case, then in method step 13, a test of the software module is performed using test parameters. If it has been found in method step 14 that the outcome of this test has been positive, then in method step 15, a variable is set in memory 2 indicating that the test has been passed. Then in method step 16, at least one application module is derived from the software module and then used by the software to implement the new function. Then in method step 17, the application is started with this new application module. If it is recognized in method step 14 that the outcome of the test was negative, then in method step 18 the variable is set in memory 2 accordingly and in method step 19 the test result is output, e.g., on display screen 9. Method step 20 terminates the method. If it is found in method step 12 that no test is necessary, the program jumps immediately to method step 17 to start the application. The application may then be started immediately using the software module because, at that point, a derivation is no longer necessary.

As shown here, the principle of inheritance is suitable for deriving at least one application module from the software module. JAVA, an object-oriented language, has proven to be particularly important in this regard. JAVA source code, known as class files, is generated and then is capable of running on any system having a JAVA virtual machine. The functions and routines implemented by such a class are also referred to as methods.

An important feature of the method according to the present invention is the use of the principle of inheritance to avoid multiple transmission of codes. One or more classes having corresponding test routines are assigned to the classes of the existing actual software. Then all classes, in the simplest case two, namely the test class and the application class, are loaded for installation of the software. The test class contains all application methods that are testable on the target system, e.g., file access authorizations and additional test methods which are to be used to test, in advance, critical situations occurring during operation. This is achieved as explained above by test call instructions of the basic methods using appropriate test parameters. Since essentially the basic functionalities of the application class are defined in the test class, the term basic class would also be accurate for this class.

The actual application class is created by the inheritance process from this class. It thus has all the methods of the test class and is supplemented by additional methods which are not testable on the target system or are not intended to be tested. In this class, methods from the test class which might not have been implemented completely or were only modified in the latter for reasons of performing the test may also be overwritten. The application class also starts the test defined in the test class, if necessary. The present invention is characterized in that the application class and test class are logically allocated to one another through the principle of inheritance, in which case the application class (application module) uses the methods of the test class (software module) again to a great extent. This saves on code which decreases the amount of time required for loading the software in comparison with independent test modules loaded additionally and also alleviates the load on system resources. An inherited class inherits properties such as variables and functions from the bequeathing class. This eliminates unnecessary repetition of program code.

What is claimed is:

1. A method for automatically updating existing software on a target device, the software implemented in an object-oriented manner, the method comprising:

expanding a functionality of the software by adding an additional software module, the additional software module including a test class and an application class, wherein the test class and the application class are derivable from a set of basic classes provided in the additional software module;

wherein the test class implements test routines by overwriting methods of a basic class, and wherein upon determining applicability of the test results from executing said test routines, the application class is derived from the test class or from a basic class, and wherein the application class is derived from the test class or from the basic class by overwriting methods of said basic class;

testing the test class of the additional software module during operation of the software, wherein the testing is automatically conducted by the implemented test routines of the test class in order to determine the applicability of the additional software with respect to the existing software; and based on the applicability determination from executing said test routines, deriving the application class as a function of a result of the test and using the application class by the additional software module for operation of the target device.

2. The method according to claim 1, further comprising receiving the software module over a wireless interface.

3. The method according to claim 1, further comprising overwriting functions used only for the test when the at least one application class is derived from the software module.

4. The method according to claim 1, wherein the software module is tested by a call instruction using test parameters.

5. The method according to claim 1, further comprising:
   monitoring, by the software, test of the software module by setting a variable; and
   repeating the test as a function of a content of the variable.

6. A method according to claim 1, wherein the application class includes inherited methods from the additional software module.

7. A method according to claim 1, wherein the test class is received via a function interface.

8. A device present in a vehicle for automatically updating software comprising:
   a processor;
   a memory;
   wherein the processor and the memory operate the software;
   a loading device for simultaneously loading an additional software module and receiving useful data;
   a bus system connected to the loading device, the bus system configured to distribute the additional software module to individual vehicle components; and
   the additional software module being for one of updating and expanding a functionality of the software of the individual vehicle components, wherein the additional software module includes a test class and an application class, and wherein the test class and the application class are derivable from a set of basic classes provided in the additional software module, and wherein the test class implements test routines by overwriting methods of a basic class, and wherein upon determining applicability of the test results from executing said test routines, the application class is derived from the test class or from a basic class, and wherein the application class is derived from the test class or from the basic class by overwriting methods of said basic class, and wherein the testing is for determining the applicability of the additional software with respect to the existing software, and wherein based on the applicability determination from executing said test routines, the application class is derived as a function of a result of the test and the application class is used by the additional software module for operation of at least one of the individual vehicle components.

9. The device according to claim 8, wherein the loading device includes a wireless interface.

* * * * *